(12) United States Patent
Yew et al.

(10) Patent No.: US 9,590,271 B2
(45) Date of Patent: Mar. 7, 2017

(54) ELECTROLYTE FOR A LITHIUM BATTERY AND A LITHIUM BATTERY COMPRISING THE SAME

(71) Applicant: Samsung SDI Co., Ltd., Yongin-si, Gyeonggi-do (KR)

(72) Inventors: Kyoung-Han Yew, Yongin-si (KR); Eui-Hwan Song, Yongin-si (KR); Cheol-Soo Jung, Yongin-si (KR); Yong-Beom Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 308 days.

(21) Appl. No.: 14/259,039

(22) Filed: Apr. 22, 2014

(65) Prior Publication Data
US 2014/0227590 A1   Aug. 14, 2014

Related U.S. Application Data

(62) Division of application No. 11/365,299, filed on Feb. 28, 2006, now abandoned.

(30) Foreign Application Priority Data

Feb. 28, 2005 (KR) .................. 10-2005-0016691

(51) Int. Cl.
*H01M 10/0567* (2010.01)
*H01M 6/16* (2006.01)
*H01M 10/052* (2010.01)
*H01M 10/0525* (2010.01)
*H01M 10/0569* (2010.01)

(52) U.S. Cl.
CPC ....... *H01M 10/0567* (2013.01); *H01M 6/164* (2013.01); *H01M 6/168* (2013.01); *H01M 10/052* (2013.01); *H01M 10/0525* (2013.01); *H01M 10/0569* (2013.01); *Y02E 60/122* (2013.01)

(58) Field of Classification Search
CPC ........ H01M 10/0567; H01M 10/0569; H01M 10/052; H01M 10/0525; H01M 6/168; H01M 6/164; Y02E 60/122
See application file for complete search history.

(56) References Cited

U.S. PATENT DOCUMENTS

| | | | |
|---|---|---|---|
| 3,764,385 A | 10/1973 | Langer et al. | |
| 4,609,600 A | 9/1986 | Heinze et al. | |
| 4,670,363 A | 6/1987 | Whitney et al. | |
| 4,737,424 A | 4/1988 | Tobishima et al. | |
| 4,808,497 A | 2/1989 | Blomgren et al. | |
| 5,154,992 A | 10/1992 | Berberick et al. | |
| 5,691,080 A | 11/1997 | Derzon et al. | |
| 5,709,968 A | 1/1998 | Shimizu | |
| 5,879,834 A | 3/1999 | Mao | |
| 6,045,952 A | 4/2000 | Kerr et al. | |
| 6,509,120 B1 | 1/2003 | Yoshimura et al. | |
| 7,279,249 B2 | 10/2007 | Kim et al. | |
| 7,445,872 B2 | 11/2008 | Kim et al. | |
| 7,968,235 B2 * | 6/2011 | Amine | H01M 10/052 429/321 |
| 2001/0006751 A1 | 7/2001 | Gan et al. | |
| 2002/0045102 A1 | 4/2002 | Jung et al. | |
| 2002/0102466 A1 * | 8/2002 | Hwang | H01M 4/13 429/326 |
| 2004/0013946 A1 | 1/2004 | Abe et al. | |
| 2004/0170903 A1 | 9/2004 | Fukuoka et al. | |
| 2004/0197667 A1 | 10/2004 | Noh et al. | |
| 2005/0123835 A1 | 6/2005 | Sun | |
| 2005/0170253 A1 * | 8/2005 | Yoon | H01M 10/0568 429/307 |
| 2005/0208371 A1 | 9/2005 | Kim et al. | |
| 2006/0024577 A1 | 2/2006 | Schwake | |
| 2006/0035144 A1 | 2/2006 | Shimizu et al. | |
| 2006/0073391 A1 * | 4/2006 | Kim | H01M 10/0525 429/329 |

FOREIGN PATENT DOCUMENTS

| | | |
|---|---|---|
| EP | 0 746 050 A1 | 12/1996 |
| EP | 0 759 641 A1 | 2/1997 |
| EP | 0 829 911 A2 | 3/1998 |
| EP | 0 829 911 A3 | 3/1999 |
| EP | 0 951 085 A1 | 10/1999 |
| JP | 07-176322 A | 7/1995 |
| JP | 2004-063432 A | 2/2004 |
| JP | 2004-179146 A | 6/2004 |
| KR | 2000-0067345 | 11/2000 |
| KR | 10-2002-0017947 A | 3/2002 |
| KR | 10-2003-0010425 A | 2/2003 |
| KR | 10-2004-0010189 A | 1/2004 |
| WO | WO 99/59218 | 11/1999 |
| WO | WO 03/081620 A1 | 10/2003 |
| WO | WO 2004/053904 A1 | 6/2004 |
| WO | WO 2005/117198 A1 | 12/2005 |

OTHER PUBLICATIONS

European Search Report dated May 30, 2006, for European application 06110467.5, in the name of Samsung SDI Co., Ltd. corresponding to Korean priority 10-2005-0016691.
KIPO Office Action issued Aug. 12, 2011 for Korean Application No. 10-2005-0016691 (8 pages).

*Primary Examiner* — Laura Weiner
(74) *Attorney, Agent, or Firm* — Lewis Roca Rothgerber Christie LLP

(57) ABSTRACT

The present invention relates to an electrolyte for a lithium battery and a lithium battery comprising the same. The electrolyte includes a non-aqueous organic solvent, a lithium salt, and a first additive capable of forming a chelating complex with a transition metal and which is stable at voltages ranging from about 2.5 to about 4.8 V.

10 Claims, 3 Drawing Sheets

ELECTROLYTE FOR A LITHIUM BATTERY AND A LITHIUM BATTERY COMPRISING THE SAME

CROSS REFERENCE TO RELATED APPLICATION

This application is a divisional of U.S. application Ser. No. 11/365,299 filed Feb. 28, 2006, now abandoned, which claims priority to and the benefit of Korean Patent Application No. 10-2005-0016691 filed in the Korean Intellectual Property Office on Feb. 28, 2005, the entire contents of all of which are incorporated herein by reference.

FIELD OF THE INVENTION

The present invention relates to an electrolyte for a lithium battery and a lithium battery comprising the same, and more particularly, to an electrolyte which improves battery safety.

BACKGROUND OF THE INVENTION

Portable electronic devices are becoming smaller and lighter due to advancements in the high-tech electronic industry. As a result, portable electronic devices are increasingly being used. The increased need for batteries having high energy density for use as power sources for these portable electronic devices has led to recent research into lithium secondary batteries.

Lithium secondary batteries have average discharge potentials of about 4 V, and more particularly 3.7 V. These lithium secondary batteries are essential to the digital generation because they are indispensable energy sources for portable digital devices such as the "3C" devices, i.e. cellular telephones, notebook computers, and camcorders, as well as other portable electronic devices.

Research has also been conducted on batteries to develop effective safety characteristics such as the prevention of overcharge. When a battery is overcharged, excess lithium ions are deposited on the positive electrode, and excess lithium ions are inserted into the negative electrode, making the positive and negative electrodes thermally unstable. An explosion may occur due to the decomposition of the electrolytic organic solvent causing thermal runaway which can seriously decrease battery safety.

To overcome these problems, an aromatic compound, such as an oxidation-reduction agent, or "redox shuttle additive," has been added to the electrolyte. For example, U.S. Pat. No. 5,709,968 to Shimizu discloses the use of a benzene compound, such as 2,4-difluoroanisole, in a non-aqueous lithium ion secondary battery to prevent thermal runaway resulting from overcharge current. Also, U.S. Pat. No. 5,879,834 to Mao discloses the use of electrochemically polymerized aromatic compounds, such as biphenyl, 3-chlorothiophene, furan, etc., to improve battery safety by increasing the internal resistance of the battery during unusual overvoltage conditions.

Redox shuttle additives quickly increase the temperature inside the battery by the heat produced by the oxidation-reduction reaction. In addition, the additive closes the pores of the separator by quickly and uniformly fusing the separator to inhibit overcharge reactions. The polymerization reaction of these redox shuttle additives consumes the overcharge current, thereby improving battery safety.

However, the need for high capacity batteries is increasing, and these redox shuttle additives cannot provide the high level of safety required of such high capacity batteries. Therefore, a need exists for an electrolyte capable of preventing overcharge and ensuring battery safety.

SUMMARY OF THE INVENTION

In one embodiment of the present invention, a lithium battery electrolyte imparts improved battery safety.

In another embodiment of the present invention, a lithium battery comprises an electrolyte which imparts improved battery safety.

One embodiment of the electrolyte for a lithium battery includes a non-aqueous organic solvent, a lithium salt, and an additive which is stable at voltages ranging from about 2.5 to about 4.8 V. The additive is capable of forming a chelating complex with a transition metal.

In another embodiment of the present invention, a lithium battery includes an electrolyte having a non-aqueous organic solvent, a lithium salt, and an additive which is stable at voltages ranging from about 2.5 to about 4.8 V. The electrolyte additive is capable of forming a chelating complex with a transition metal. The battery further comprises a positive electrode and a negative electrode. The positive electrode comprises a positive active material capable of intercalating and deintercalating lithium ions. The negative electrode comprises an active material selected from the group consisting of materials capable of intercalating/deintercalating lithium ions, lithium metals, lithium-containing alloys, and materials capable of forming lithium-containing compounds by reversibly reacting lithium.

BRIEF DESCRIPTION OF THE DRAWINGS

These and other features and advantages of the present invention will be better understood by reference to the following detailed description when considered in conjunction with the accompanying drawings, in which.

DETAILED DESCRIPTION OF THE PRESENT INVENTION

Exemplary embodiments of the present invention will now be described with reference to the accompanying drawings. However, one of ordinary skill in the art understands that various modifications may be made to the described embodiments, and that the invention is not limited to the described embodiments. Rather, the embodiments are described for illustrative purposes only.

Figure 1:
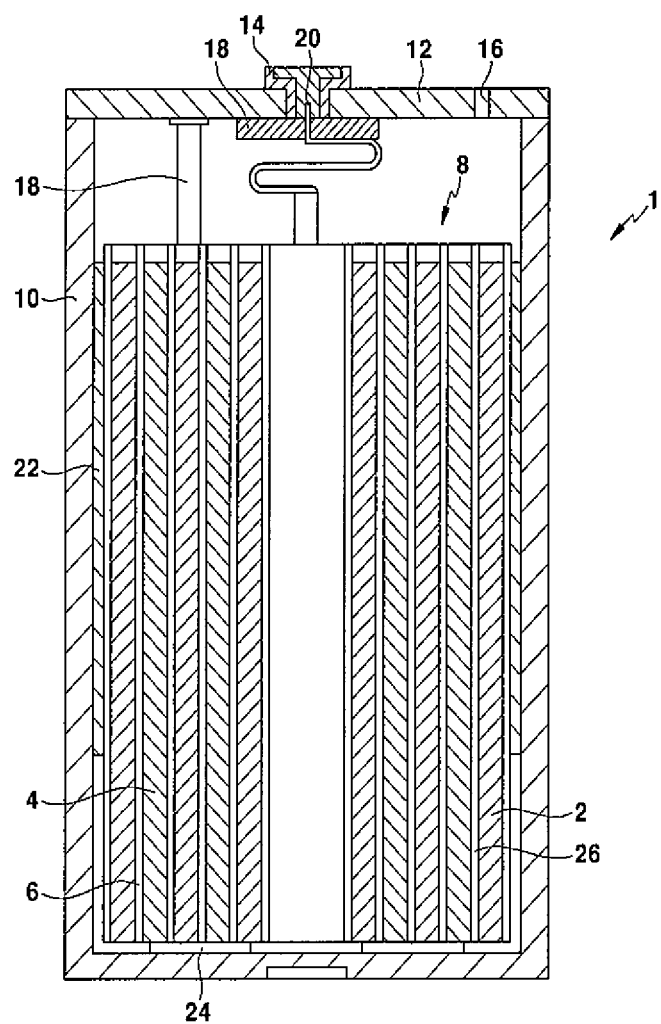
FIG. 1 is a cross-sectional view of a lithium battery according to one embodiment of the present invention.

The present invention relates to an electrolyte for a lithium battery. FIG. 1 is a cross-sectional view of a non-aqueous lithium secondary battery according to one embodiment of the present invention. The battery 1 comprises an electrode assembly 8 contained within a battery case 10. The electrode assembly 8 includes a positive electrode 2, a negative electrode 4 and a separator 6 positioned between the positive and negative electrodes 2 and 4, respectively. The positive and negative electrodes 2 and 4, respectively, comprises active materials capable of intercalating and deintercalating lithium ions. The separator can comprise polyethylene, polypropylene, or a combination thereof.

An electrolyte 26 is injected into the battery case 10 and impregnated into the separator 6. The battery case 10 is sealed with a cap plate 12 and sealing gasket 14. The cap plate 12 has a safety vent 16 for releasing overpressure. A positive electrode tab 18 is attached to the positive electrode 2, and a negative electrode tab 20 is attached to the negative electrode 4. Insulators 22 and 24 are positioned on the bottom surface and side surfaces of the electrode assembly 8 to prevent short circuits in the battery.

In lithium secondary batteries, temperature increases abruptly during overcharge due to incorrect operation or break-down of the battery, or when short circuits occur due to a defect in battery design. This abrupt increase in temperature results in thermal runaway. During overcharge, excess lithium ions are released from the positive electrode and deposited on the surface of the negative electrode, rendering the positive and negative electrodes unstable. As a result, exothermic reactions rapidly increase the temperature inside the battery, causing thermal runaway and generating fire and smoke. Such exothermic reactions may include pyrolysis of the electrolyte, reactions between the electrolyte and lithium, oxidation reactions of the electrolyte and the positive electrode, reactions between the electrolyte and oxygen gas generated from the pyrolysis of the positive active material, etc.

In light of these problems, various additives have been researched, including overcharge-inhibiting additives and additives for improving battery safety when stored at high temperatures. However, although these additives serve their intended objective, they have other shortcomings. For example, overcharge-inhibiting additives, such as phenyl acetate, decrease the safety of the battery when stored at high temperatures. Additionally, metal impurities, which remain after battery fabrication, cause voltage drops.

The electrolytes according to one embodiment of the present invention include first additives which trap the metals or metal impurities released from the positive electrode during overcharge or high temperate storage. These first additives are stable at voltages ranging from about 2.5 to about 4.8 V, and are capable of forming chelating complexes with chelating metals. The first additive traps metals, thereby preventing voltage drops and decreasing safety risks caused by deposition of metal on the negative electrode, which can result in short circuits. In particular, the first additives ensure battery safety when stored at high temperatures.

The first additive is capable of forming a chelating complex and comprises a compound represented by Formulas 1 to 3 and mixtures thereof:

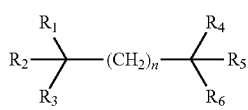

(1)

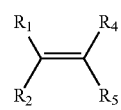

(2)

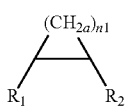

(3)

In Formulas 1 through 3, $R_1$, $R_2$, $R_3$, $R_4$, $R_5$, and $R_6$ may be either the same or different compounds. However, at least one of $R_1$ through $R_3$ and at least one of $R_4$ through $R_6$ is a compound represented by the formula $A_xR'$, where A is selected from the group consisting of N, O, P and S, x is 0 or 1, and R' is selected from the group consisting of CN, $C_1$ to $C_{15}$ linear alkyls, $C_1$ to $C_{15}$ linear carboxyls, $C_1$ to $C_{15}$ branch alkyls and $C_1$ to $C_{15}$ branch carboxyls. The remaining $R_1$ through $R_6$ groups each comprise a material selected from the group consisting of H, halogens, $C_1$ to $C_{15}$ alkyls and $C_6$ to $C_{15}$ aryls. In the Formulas 1 through 3, n is an integer ranging from 0 to 10, and n1 is an integer ranging from 0 to 15. When n1 is an odd number, a is 1, and when n1 is an even number, a is either ½ or 1.

Non-limiting examples of first additives suitable for use in the present invention include the compounds represented by the following Formulas 4 to 26 and mixtures thereof:

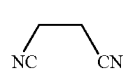

(4)

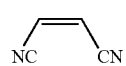

(5)

(6)

(7)

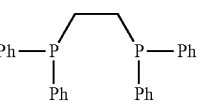

(8)

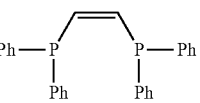

(9)

(10)

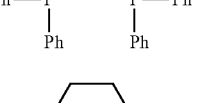

(11)

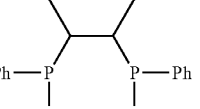

(12)

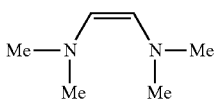 (13)

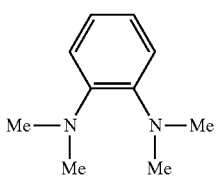 (14)

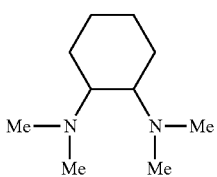 (15)

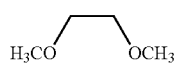 (16)

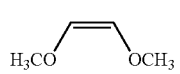 (17)

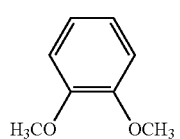 (18)

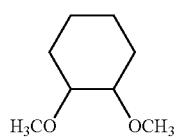 (19)

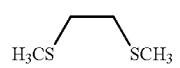 (20)

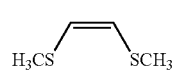 (21)

 (22)

 (23)

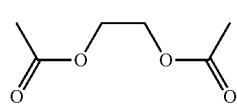 (24)

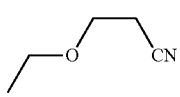 (25)

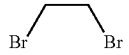 (26)

In the above Formulas 4 to 26, Me is methyl and Ph is phenyl.

In one embodiment, the first additive is present in an amount ranging from about 0.1 to about 10 wt % based on the total weight of the electrolyte. In another embodiment, the first additive is present in an amount ranging from about 1 to about 5 wt % based on the total weight of the electrolyte. In yet another embodiment, the first additive is present in an amount ranging from about 3 to about 5 wt % based on the total weight of the electrolyte. When the first additive is present in an amount less than about 0.1 wt %, the effect of the addition is negligible. When the first additive is present in an amount more than about 10 wt %, cycle life upon charge and discharge deteriorates.

The electrolyte may further include a second additive capable of releasing a transition metal from the positive electrode. The combination of the first additive, which is capable of forming a chelating complex, with the second additive substantially converts overcharge mode, caused by an internal short circuit, to shut-down mode, resulting in guaranteed safety during overcharge.

The second additive can comprise an ester-based compound. Non-limiting examples of such an ester-based compound include phenyl acetate, benzyl benzoate, ethyl acetate, 1-naphthyl acetate, 2-chromanone, and ethyl propionate.

In one embodiment, the second additive is present in an amount ranging from about 1 to about 10 parts by weight based on 100 parts by weight of the electrolyte. In another embodiment, the second additive is present in an amount ranging from about 1 to about 7 parts by weight based on 100 parts by weight of the electrolyte. In yet another embodiment, the second additive is present in an amount ranging from about 3 to 5 parts by weight based on 100 parts by weight of the electrolyte. When the second additive is present in an amount less than about 1 part by weight, overcharge is not substantially inhibited. When the second additive is present in an amount more than about 10 parts by weight, cycle life may deteriorate.

The electrolyte further includes a non-aqueous organic solvent and a lithium salt. The lithium salt supplies the lithium ions in the battery, making the basic operation of the lithium battery possible. The non-aqueous organic solvent is the medium for mobilizing the ions capable of participating in the electrochemical reaction.

Non-limiting examples of suitable lithium salts include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_4$, $LiAlCl_4$, $LiN(C_xF_{2x+1}SO_2)(C_yF_{2y+1}SO_2)$ wherein x and y are natural numbers, LiCl, LiI and mixtures thereof.

In one embodiment, the concentration of the lithium salt ranges from about 0.6 to about 2.0 M. In another embodiment, the concentration of the lithium salt ranges from about 0.7 to about 1.6 M. When the concentration of the lithium salt is less than about 0.6 M, electrolyte performance deteriorates due to its ionic conductivity. When the concentration of the lithium salt is greater than about 2.0 M, the mobility of the lithium ions decreases due to increased electrolyte viscosity.

The non-aqueous organic solvent may include carbonates, esters, ethers, ketones and mixtures thereof. Non-limiting examples of suitable carbonates include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), and butylene carbonate (BC). Non-limiting examples of esters include n-methyl acetate, n-ethyl acetate, n-propyl acetate, and the like.

In one embodiment, the organic solvent includes a mixture of a chain carbonate and a cyclic carbonate. In this embodiment, the volume ratio of the cyclic carbonate to the chain carbonate ranges from about 1:1 to about 1:9. When the volume ratio of the cyclic carbonate to the chain carbonate is within this range, and the mixture is used as an electrolyte, electrolyte performance is improved.

In another embodiment, the electrolyte may further comprise a mixture of carbonate solvents and aromatic hydrocarbon solvents, such as those represented by Formula 27:

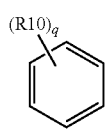

(27)

In Formula 27, R10 is a compound selected from the group consisting of halogens and $C_1$ to $C_{10}$ alkyls, and q is an integer ranging from 0 to 6. Non-limiting examples of aromatic hydrocarbon solvents suitable for use in the present invention include benzene, fluorobenzene, toluene, trifluorotoluene, chlorobenzene, and xylene.

The volume ratio of carbonate solvents to aromatic hydrocarbon solvents ranges from about 1:1 to about 30:1. When the volume ratio of carbonate solvents to aromatic hydrocarbon solvents is within this range, and the mixture is used as an electrolyte, electrolyte performance is enhanced.

The electrolyte may further include a third additive comprising a compound selected from the group consisting of vinylene carbonate, divinylsulfone, ethylene sulfite and carbonates having substituents selected from the group consisting of halogens, cyano (CN) groups, and nitro ($NO_2$) groups. This third additive improves the electrochemical characteristics of the battery. For example, the third additive inhibits swelling at high temperatures and increases capacity, cycle life, and low-temperature properties. In one embodiment, the third additive comprises a carbonate additive. Non-limiting examples of suitable carbonate additives include ethylene carbonate derivatives, such as fluoroethylene carbonate, and the compounds represented by Formula 28:

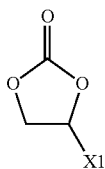

(28)

In Formula 28, X1 is selected from the group consisting of halogens, cyano (CN) groups, and nitro ($NO_2$) groups.

The electrolyte of the present invention is prepared by adding the additives and the lithium salt to a non-aqueous organic solvent. Alternatively, the additives may be added to a solution of the lithium salt dissolved in the organic solvent. The order of addition of the lithium salt and the additives is not important.

In one embodiment of the present invention, a lithium battery includes the inventive electrolyte. In this embodiment, the positive active material comprises a lithiated intercalation compound, which is capable of intercalating/deintercalating lithium. The negative active material is selected from the group consisting of carbonaceous materials capable of intercalating/deintercalating lithium, lithium metals, lithium-containing alloys and materials capable of reversibly forming lithium-containing compounds by reacting lithium.

The lithium battery may be either a lithium primary battery or a lithium secondary battery.

The lithium batteries of the present invention have improved overcharge inhibition properties when compared with batteries having conventional non-aqueous electrolytes.

The following Examples, Experimental Examples and Comparative Examples further illustrate the present invention and are presented for illustrative purposes only. However, the present invention is not limited by these Examples, Experimental Examples and Comparative Examples.

Comparative Example 1

94 g of $LiCoO_2$ as a positive active material, 3 g of Super P (acetylene black) as a conductive agent, and 3 g of polyvinylidenefluoride (PVdF) as a binder were mixed in N-methyl-2-pyrrolidone (NMP) to prepare a positive electrode slurry. The slurry was coated on aluminum foil having a width of 4.9 cm and a thickness of 147 μm. The slurry coated aluminum foil was then dried, compressed, and cut to form a positive electrode.

90 g of mesocarbon fiber (MCF from PETROCA company) as a negative active material and 10 g of PVdF as a binder were mixed to prepare a negative electrode slurry. The slurry was coated on copper foil having a width of 5.1 cm and a thickness of 178 μm. The slurry coated copper foil was then dried, compressed and cut to form a negative electrode.

A polyethylene film separator was positioned between the positive and negative electrodes, and the positive and negative electrodes and the separator were then wound to form an electrode assembly. The electrode assembly was placed in a battery case and an electrolyte was injected into the case under pressure, thus completing the lithium secondary battery cell.

The electrolyte was prepared by dissolving 1 M $LiPF_6$ in a mixed solvent of ethylene carbonate, ethylmethyl carbonate, dimethyl carbonate, and fluorobenzene. The volume ratio of ethylene carbonate:ethylmethyl carbonate:dimethyl carbonate:fluorobenzene was 3:5:1:1. Chlorotoluene was added in an amount of 10 parts by weight based on 100 parts by weight of the prepared electrolyte, and phenyl acetate was added in an amount of 7 parts by weight.

Three battery cells, No. 1, No. 2 and No. 3, were prepared according to Comparative Example 1. Open Circuit Voltage (OCV), Internal Resistance (IR), and battery thickness of each cell were measured after standard charge and after placement at 85° C. for 4 hours. These measurements are shown in Table 1.

TABLE 1

| Cell No. | After standard charge | | | After placement at 85° C. for 4 hours | | |
|---|---|---|---|---|---|---|
| | OCV (V) | IR (mohm) | Thickness (mm) | OCV (V) | IR (mohm) | Thickness (mm) |
| No. 1 | 4.15 | 51.3 | 5.65 | 1.00 | 430.0 | 8.00 |
| No. 2 | 4.14 | 52.7 | 5.57 | 0.80 | 457.4 | 7.50 |
| No. 3 | 4.14 | 51.8 | 5.59 | 1.10 | 347.5 | 7.80 |

As shown in Table 1, when only phenyl acetate is used as an additive, after placement of the cells at high temperature, the OCV of each cell decreased significantly and battery thickness increased remarkably. This indicates that gas was generated inside the battery, causing serious swelling.

Comparative Example 2

A lithium secondary battery was prepared as in Comparative Example 1, except that phenyl acetate was not used.

Experimental Example 1

Figure 2:
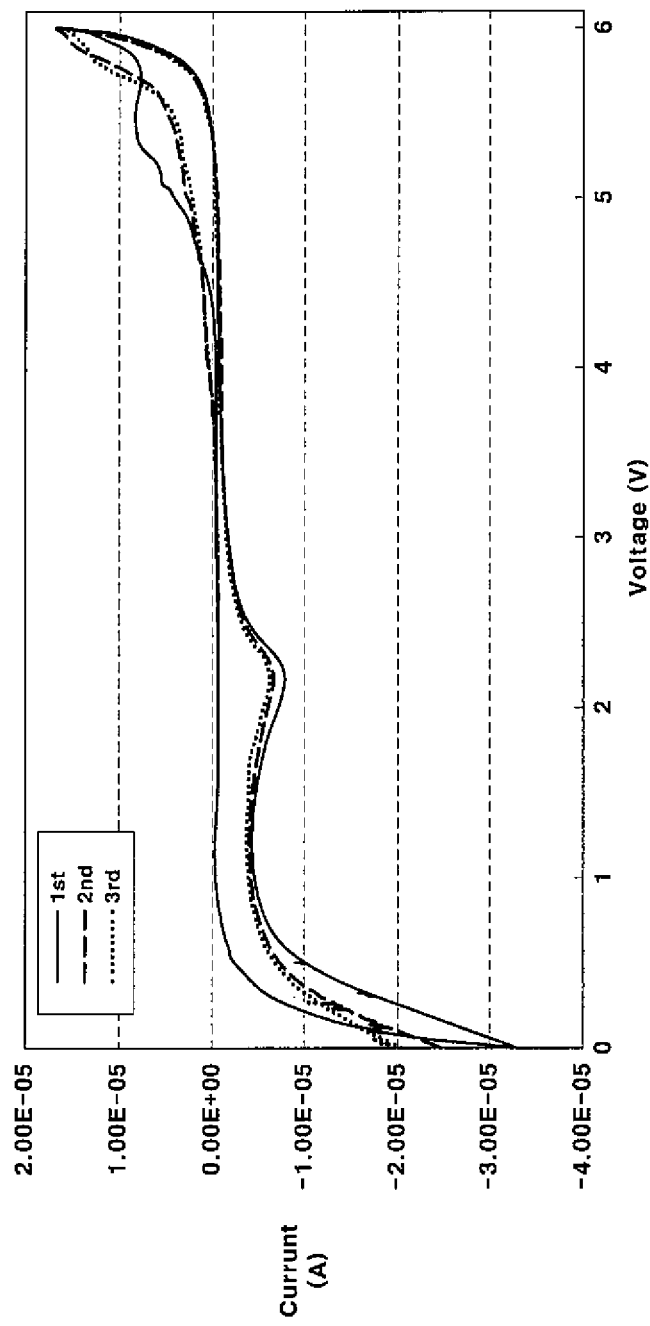
FIG. 2 is a graph of the voltammetry measurements of a lithium secondary battery prepared according to Experimental Example 1.

A working electrode was prepared using glassy carbon, and a reference electrode and counter electrode was prepared using lithium metal. Cyclic voltammetry of succino nitrile was then measured three times at a scanning rate of 0.5 mV/second. The results are shown in FIG. 2. As shown in FIG. 2, succino nitrile did not show an oxidation-reduction peak between 2.5 and 4.8 V, indicating that this compound is stable in this voltage range.

Experimental Example 2

A positive electrode was prepared as in Comparative Example 1 and subjected to the standard charge conditions. The positive electrode was then dipped in an electrolyte solution. Subsequently, phenyl acetate and a first additive capable of forming a chelating complex were added to the positive electrode, and the positive electrode was then stored at 85° C. for four hours. Table 2 lists the first additive used and the color of the electrolyte solution.

TABLE 2

| | Initial color | Color after storage at 85° C. for 4 hours |
|---|---|---|
| Example 1 | Transparent | Deep orange |
| Succino nitrile | Transparent | pale yellow |
| Aceto nitrile | Transparent | Light pink |
| Valero nitrile | Transparent | Light pink |
| 3-ethoxy-propionifrile | Transparent | Light pink |
| Ethylene glycol diacrylate | Transparent | Pink |
| 1,2-bis(diphenylphosphino)ethane | Pale yellow | Yellow |
| 1,2-dibromoethane | Transparent | Pale orange |
| Ethylenediamine | Yellow | Deep brown |
| Tetraethylenediamine | Yellow | Deep brown |

Table 2 shows that after cobalt was released a complex was formed resulting in a change of color. From the results shown in Table 2, amine-based compounds are expected to react with the electrolyte solution to cause the color to change to deep brown.

Example 1

A lithium secondary battery was fabricated as in Comparative Example 1, except that the electrolyte was prepared by adding succino nitrile to a solution of 1 M $LiPF_6$ dissolved in a mixed solvent of ethylene carbonate, ethylmethyl carbonate, dimethyl carbonate and fluorobenzene. The volume ratio of ethylene carbonate:ethylmethyl carbonate:dimethyl carbonate:fluorobenzene was 3:5:5:1. The succino nitrile was added in an amount of 5 wt % based on the total weight of electrolyte.

Example 2

A lithium secondary battery was fabricated as in Example 1, except that the electrolyte was prepared by adding succino nitrile and phenyl acetate to a solution of 1 M $LiPF_6$ dissolved in a mixed solvent of ethylene carbonate, ethylmethyl carbonate, dimethyl carbonate and fluorobenzene. The volume ratio of ethylene carbonate:ethylmethyl carbonate:dimethyl carbonate:fluorobenzene was 3:5:5:1. The succino nitrile was added in an amount of 5 wt % based on the total weight of electrolyte, and the phenyl acetate was added in an amount of 3 parts by weight based on 100 parts by weight of the electrolyte.

Example 3

A lithium secondary battery was fabricated as in Example 1, except that 3-ethoxy-propionitrile (EPN:) was used instead of succino nitrile. The 3-epoxy-propionitrile was added in an amount of 5 wt % based on the total weight of electrolyte.

Example 4

A lithium secondary battery was fabricated as in Example 1, except that ethylene glycol diacrylate (EGDA) was used instead of succino nitrile. The ethylene glycol diacrylate was added in an amount of 5 wt % based on the total weight of electrolyte.

Example 5

A lithium secondary battery was fabricated as in Example 1, except that 1,2-bis(diphenylphosphino)ethane (DPPE) was used instead of succino nitrile. The 1,2-bis(diphenylphosphino)ethane was added in an amount of 5 wt % based on the total weight of electrolyte.

Example 6

A lithium secondary battery was fabricated as in Example 1, except that 1,2-dibromoethane (DBE) was used instead of succino nitrile. The 1,2-dibromoethane was added in an amount of 5 wt % based on the total weight of electrolyte.

Figure 3:
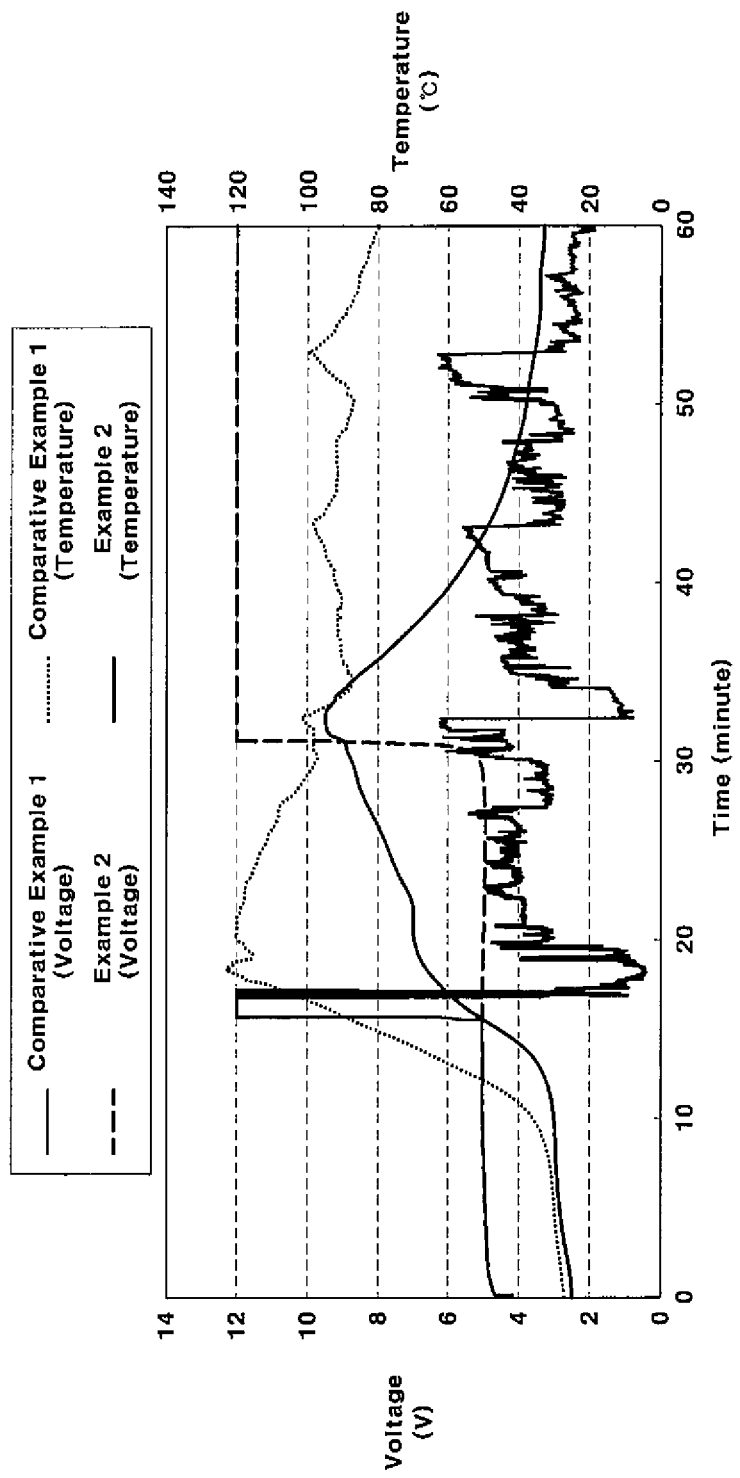
FIG. 3 is a graph of the current, temperature, and voltage characteristics, measured at 1.5 C, during overcharging of lithium batteries prepared according to Example 2 and Comparative Example 2.

The lithium battery cells prepared according to Example 2 and Comparative Example 1 were overcharged at 1.5 C, and voltage and temperature were measured according to operating time. These measurements are shown in FIG. 3. As shown in FIG. 3, the lithium battery cell prepared according to Comparative Example 1, using only phenyl acetate as an additive, exhibited unstable voltage according to operating time, and the battery temperature was very high indicating poor battery safety. On the contrary, the lithium battery cell prepared according to Example 2, using phenyl acetate and succino nitrile, exhibited uniform operating voltage and the battery temperature was lower than that of Comparative Example 1, indicating improved battery safety.

The battery cells of Examples 1 to 6 and Comparative Examples 1 and 2 were stored at 85° C. for 4 hours. The battery cells of Examples 1 to 6 and Comparative Examples 1 and 2 were each separately overcharged. Overcharge was performed fully charging each cell to 4.2 V. Lead wires were prepared by resistant-welding a nickel tab to respective terminals. The lead wires were connected to charge-discharge equipment, and the battery cell was overcharged to 1.5 C (1.6 A)/12 V under constant current/constant voltage. After reaching 12 V, current was applied for 2.5 hours. During overcharge, the firing and explosion of cells were measured. These measurements are shown in Table 3. In Table 3, safety at overcharge is reported as follows:

L0: good, L1: leakage, L2: flash, L2: flame, L3: smoke, L4: ignition, L5: explosion.

TABLE 3

| | Additive capable of forming chelating complex | Amount (%) | Amount of phenyl acetate (parts by weight) | Standard capacity (mAh) | Placement at high temperature | Overcharge |
|---|---|---|---|---|---|---|
| Com. Ex. 2 | — | — | 0 | 1083 | OK | L5 |
| Com. Ex. 1 | — | — | 7 | 1060 | NG | L0 |
| Ex. 1 | succino nitrile | 5 | 0 | 1070 | OK | L3 |
| Ex. 2 | succino nitrile | 5 | 3 | 1060 | OK | L0 |
| Ex. 3 | EPN | 5 | 0 | 1088 | OK | L4 |
| Ex. 4 | EGDA | 5 | 0 | 1051 | OK | L3 |
| Ex. 5 | DPPE | 5 | 0 | 1048 | OK | L4 |
| Ex. 6 | DBE | 5 | 0 | 1062 | OK | L5 |

As shown in Table 3, Example 2, in which succino nitrite and phenyl acetate were used exhibited good characteristics after high temperature storage and exhibited safety at overcharge. Examples 3 to 6, in which no phenyl acetate was used, exhibited satisfactory characteristics after high temperature storage and exhibited improved safety properties compared to Comparative Example 2, in which no additive was used. However, Examples 3 to 6 did not exhibit safety levels near L0.

Comparative Example 2, in which no additive was used, satisfied requirements for high temperature storage, but showed poor safety during overcharge. Comparative Example 1, in which only phenyl acetate was used as an additive, showed good safety at overcharge but poor performance after high temperature storage.

The battery cells according to Example 2 and Comparative Example 2 were subjected to standard charge, after which the OCV, IR, and battery thickness were measured. The battery cells were then stored at 85° C. for 4 hours, after which the OCV, IR, and battery thickness (t) were measured again. The battery thickness (t) was measured at 85° C. and at room temperature. These measurements are reported in Table 4.

Table 4 also reports the capacity of each cell after standard charge-discharge (STD_DC). In addition, Table 4 reports the discharge capacity of each cell measured after storage at high temperature and immediately cooling (ret(DC)). Finally, Table 4 reports the capacity of each cell measured after storage at high temperature, discharging, and then charging-discharging (rec(DC)). In Table 4, ret(DC) indicates charge capacity maintenance and rec(DC) indicates capacity maintenance after storage at high temperature.

TABLE 4

| | After standard charge | | | After placing at 85° C. for 4 hours | | | | | | |
|---|---|---|---|---|---|---|---|---|---|---|
| | OCV (V) | IR (mohm) | t (mm) | OCV (V) | IR (mohm) | t (mm, 85° C.) | t (mm, Room temp.) | STD_DC (mAh) | ret(DC) (mAh) | rec(DC) (mAh) |
| Ex. 2 (No. 1) | 4.15 | 48.6 | 5.67 | 4.11 | 59.8 | 6.13 | 5.85 | 1053.4 | 944.2 | 959.2 |
| Ex. 2 (No. 2) | 4.15 | 48.1 | 5.69 | 4.12 | 58.1 | 6.27 | 5.88 | 1063.5 | 975.3 | 991.9 |
| Ex. 2 (No. 3) | 4.18 | 48.8 | 5.72 | 4.12 | 59.8 | 6.12 | 5.91 | 1061.2 | 959.0 | 966.2 |
| Ex. 2 (No. 4) | 4.18 | 50.0 | 5.63 | 4.12 | 69.8 | 6.01 | 5.76 | 1039.2 | 920.6 | 922.4 |
| Ex. 2 (No. 5) | 4.18 | 47.9 | 5.66 | 4.13 | 58.4 | 6.23 | 5.86 | 1066.9 | 956.5 | 965.5 |
| Average | 4.17 | 48.7 | 5.67 | 4.12 | 61.2 | 6.15 | 5.85 | 1056.8 | 951.1 | 961.0 |
| Com. Ex. 2 (No. 1) | 4.16 | 44.7 | 5.47 | 4.14 | 48.8 | 5.79 | 5.70 | 1085.6 | 1022.1 | 1019.6 |
| Com. Ex. 2 (No. 2) | 4.16 | 45.9 | 5.45 | 4.14 | 50.1 | 5.82 | 5.66 | 1082.9 | 1011.8 | 1009.3 |
| Average | 4.16 | 45.3 | 5.46 | 4.14 | 49.5 | 5.81 | 5.68 | 1084.3 | 1017.0 | 1014.5 |

The measurements reported in Table 4 show that the battery cell prepared according to Example 2 and the battery cell prepared according to Comparative Example 2 perform similarly. As shown in Tables 3 and 4, the combination of succino nitrile and phenyl acetate maintains battery performance, improves battery stability at high temperatures, and ensures battery safety during overcharge.

The present invention has been described with reference to exemplary embodiments. However, those skilled in the art will appreciate that various modifications and substitutions can be made without departing from the spirit and scope of the present invention as set forth in the appended claims.

What is claimed is:

1. An electrolyte for a lithium battery comprising:
   a non-aqueous organic solvent;
   a lithium salt;
   a first additive capable of forming a chelating complex with a transition metal, the first additive being stable at voltages ranging from about 2.5 to about 4.8 V; and
   a second additive selected from the group consisting of phenyl acetate, benzyl benzoate, 1-naphthyl acetate, and 2-chromanone,
   wherein the first additive is present in the electrolyte in an amount of about 0.1 wt % to about 10 wt % based on the total weight of the electrolyte,
   the second additive is present in the electrolyte in an amount of about 1 to about 10 parts by weight based on 100 parts by weight of the electrolyte, and
   the first additive comprises a compound selected from the group consisting of compounds represented by Formulas 1, 3-11, 13-15, 17, 19-21, 23 and 26, and combinations thereof:

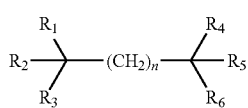
(1)

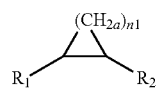
(3)

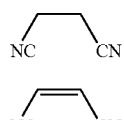
(4)

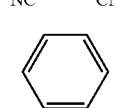
(5)

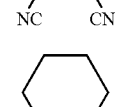
(6)

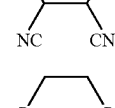
(7)

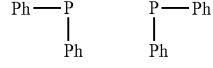
(8)

-continued

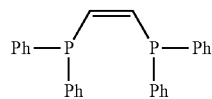
(9)

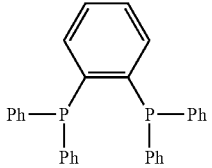
(10)

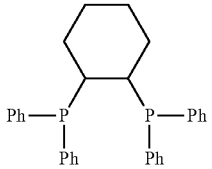
(11)

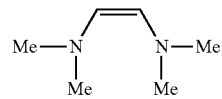
(13)

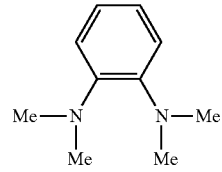
(14)

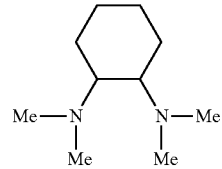
(15)

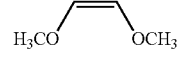
(17)

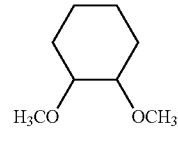
(19)

(20)

(21)

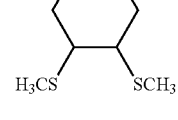
(23)

(26)

wherein n is an integer of 0 to 10, n1 is an integer of 0 to 15, wherein when n1 is an odd number, a is 1 and when n1 is an even number, a is either ½ or 1; and at least one of $R_1$ through $R_3$ and at least one of $R_4$ through $R_6$ is a substituent represented by $A_xR'$, wherein A is selected from the group consisting of N, O, P, and S, x is 0 or 1, and R' is selected from the group consisting of CN, $C_1$ to $C_{15}$ linear alkyls, $C_1$ to $C_{15}$ linear carboxyls, $C_1$ to $C_{15}$ branch alkyls and $C_1$ to $C_{15}$ branch carboxyls, and wherein the remaining $R_1$ through $R_6$ groups each comprises a substituent selected from the group consisting of H, halogens, $C_1$ to $C_{15}$ alkyls and $C_6$ to $C_{15}$ aryls.

2. The electrolyte of claim 1, wherein the first additive comprises a compound selected from the group consisting of compounds represented by Formulas 4-11, 13-15, 17, 19-21, 23 and 26:

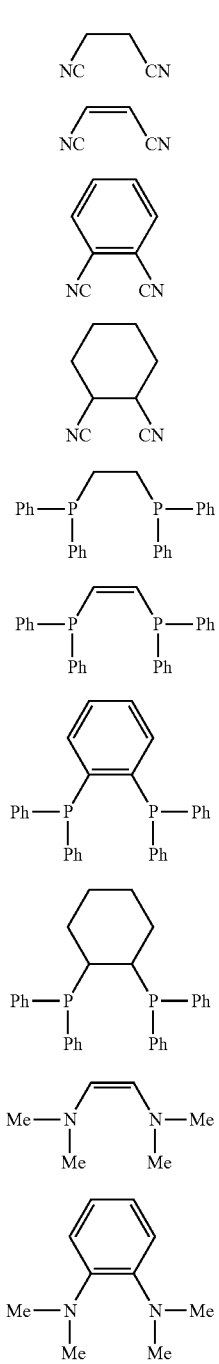

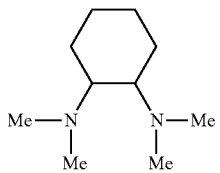

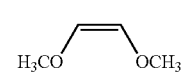

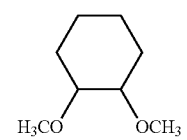

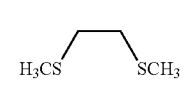

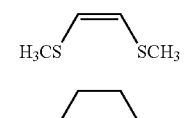

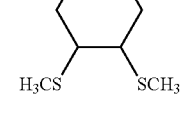

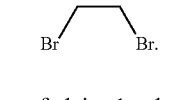

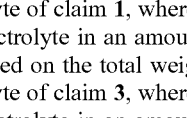

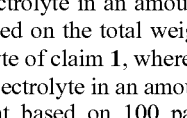

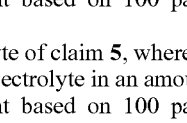

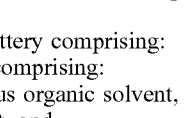

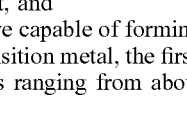

3. The electrolyte of claim 1, wherein the first additive is present in the electrolyte in an amount of about 1 wt % to about 5 wt % based on the total weight of the electrolyte.

4. The electrolyte of claim 3, wherein the first additive is present in the electrolyte in an amount of about 3 wt % to about 5 wt % based on the total weight of the electrolyte.

5. The electrolyte of claim 1, wherein the second additive is present in the electrolyte in an amount of about 1 to about 7 parts by weight based on 100 parts by weight of the electrolyte.

6. The electrolyte of claim 5, wherein the second additive is present in the electrolyte in an amount of about 3 to about 5 parts by weight based on 100 parts by weight of the electrolyte.

7. A lithium battery comprising:
   an electrolyte comprising:
     a non-aqueous organic solvent,
     a lithium salt, and
     a first additive capable of forming a chelating complex with a transition metal, the first additive being stable at voltages ranging from about 2.5 to about 4.8 V; and
     a second additive selected from the group consisting of phenyl acetate, benzyl benzoate, 1-naphthyl acetate, and 2-chromanone,
   a positive electrode comprising a positive active material capable of intercalating and deintercalating lithium ions; and
   a negative electrode comprising an active material selected from the group consisting of materials capable of intercalating/deintercalating lithium ions, lithium metals, lithium-containing alloys, and materials capable of forming lithium-containing compounds by reversibly reacting lithium, wherein the first additive is present in the electrolyte in an amount of about 0.1 wt % to about 10 wt % based on the total weight of the electrolyte, the second additive is present in the electrolyte in an amount of about 1 to about 10 parts by weight based on 100 parts by weight of the electrolyte, and the first additive comprises a compound selected from the group consisting of compounds represented by Formulas 1, 3-11, 13-15, 17, 19-21, 23 and 26, and combinations thereof:

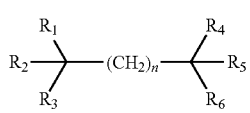  (1)

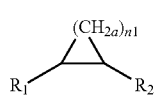  (3)

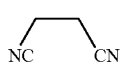  (4)

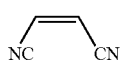  (5)

  (6)

  (7)

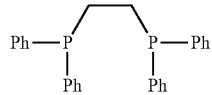  (8)

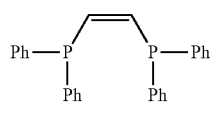  (9)

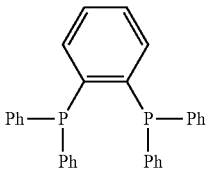  (10)

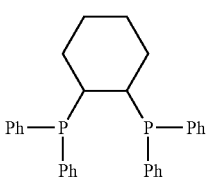  (11)

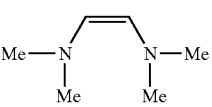  (13)

-continued

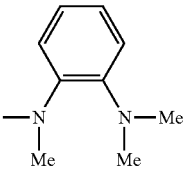  (14)

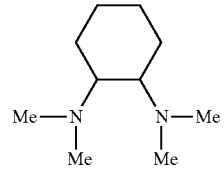  (15)

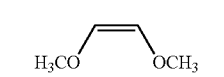  (17)

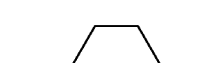  (19)

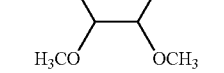  (20)

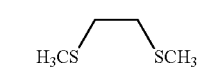  (21)

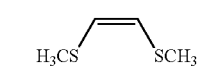  (23)

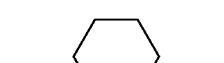  (26)

wherein n is an integer of 0 to 10, n1 is an integer of 0 to 15, wherein when n1 is an odd number, a is 1 and when n1 is an even number, a is either ½ or 1; and at least one of $R_1$ through $R_3$ and at least one of $R_4$ through $R_6$ is a substituent represented by $A_xR'$, wherein A is selected from the group consisting of N, O, P, and S, x is 0 or 1, and R' is selected from the group consisting of CN, $C_1$ to $C_{15}$ linear alkyls, $C_1$ to $C_{15}$ linear carboxyls, $C_1$ to $C_{15}$ branch alkyls and $C_1$ to $C_{15}$ branch carboxyls, and wherein the remaining $R_1$ through $R_6$ groups each comprises a substituent selected from the group consisting of H, halogens, $C_1$ to $C_{15}$ alkyls and $C_6$ to $C_{15}$ aryls.

8. The lithium battery of claim 7, wherein the first additive comprises a compound selected from the group consisting of compounds represented by Formulas 4-11, 13-15, 17, 19-21, 23 and 26, and mixtures thereof:

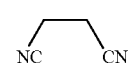  (4)

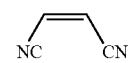  (5)

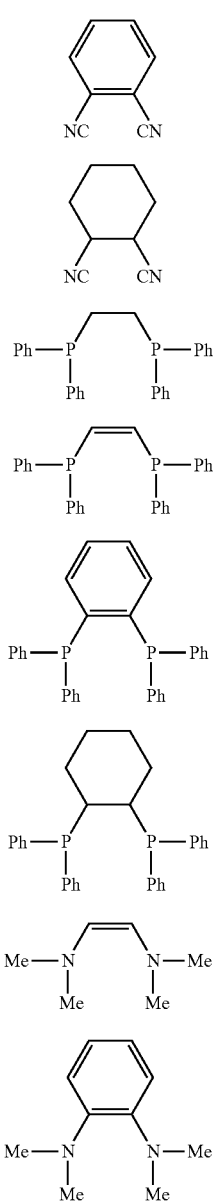
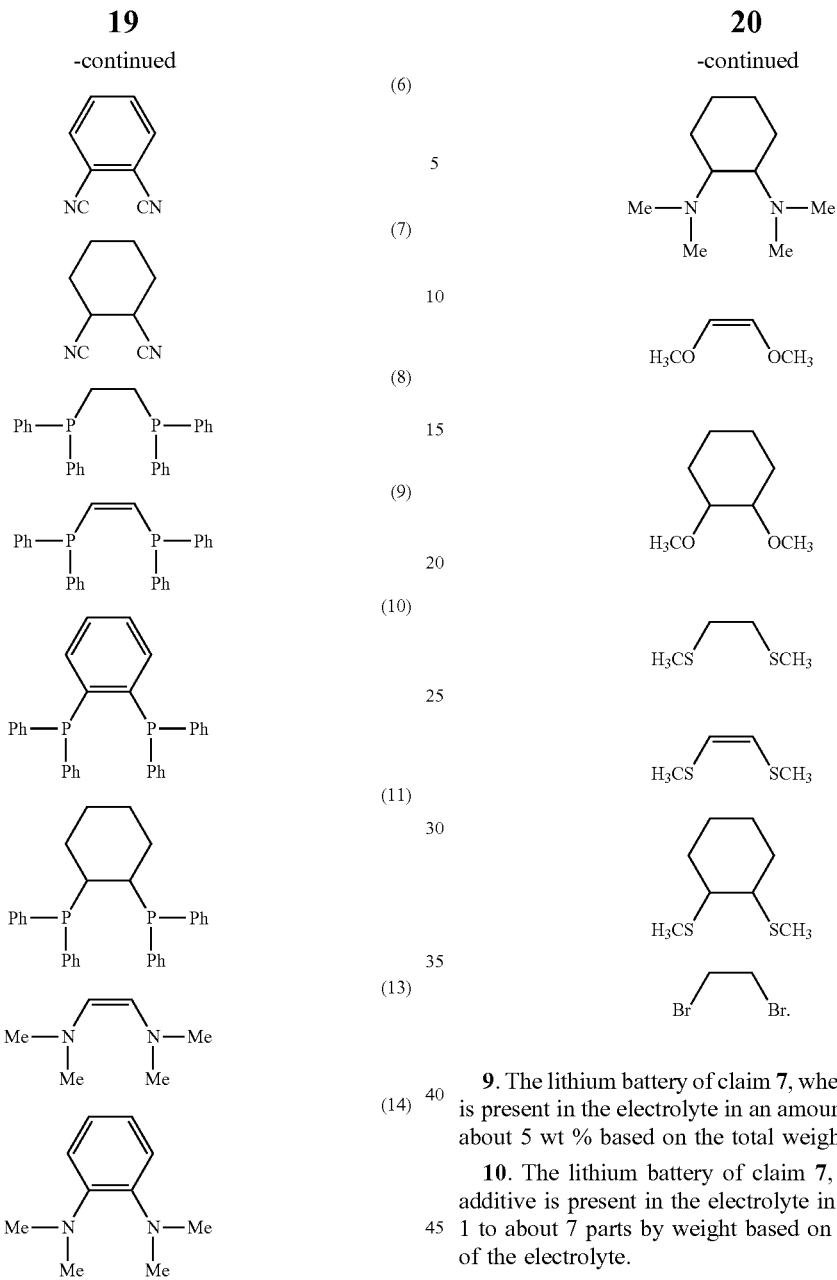
9. The lithium battery of claim 7, wherein the first additive is present in the electrolyte in an amount of about 1 wt % to about 5 wt % based on the total weight of the electrolyte.
10. The lithium battery of claim 7, wherein the second additive is present in the electrolyte in an amount of about 1 to about 7 parts by weight based on 100 parts by weight of the electrolyte.
* * * * *